United States Patent
Tanaka et al.

(10) Patent No.: US 7,893,153 B2
(45) Date of Patent: Feb. 22, 2011

(54) PROCESS FOR PRODUCING MODIFIED CONJUGATED DIENE POLYMER, MODIFIED CONJUGATED DIENE POLYMER OBTAINED BY THE PROCESS, AND RUBBER COMPOSITION CONTAINING THE SAME

(75) Inventors: Ryouji Tanaka, Tokyo (JP); Kouichirou Tani, Tokyo (JP); Takuo Sone, Tokyo (JP); Toshihiro Tadaki, Tokyo (JP); Junko Kurazumi, Kodaira (JP); Koji Masaki, Kodaira (JP); Yoichi Ozawa, Kodaira (JP)

(73) Assignees: JSR Corporation, Tokyo (JP); Bridgestone Corporation, Tokyo (JP)

( * ) Notice: Subject to any disclaimer, the term of this patent is extended or adjusted under 35 U.S.C. 154(b) by 329 days.

(21) Appl. No.: 12/089,216

(22) PCT Filed: Oct. 4, 2006

(86) PCT No.: PCT/JP2006/319895

§ 371 (c)(1),
(2), (4) Date: Jun. 13, 2008

(87) PCT Pub. No.: WO2007/040252

PCT Pub. Date: Apr. 12, 2007

(65) Prior Publication Data

US 2010/0222502 A1    Sep. 2, 2010

(30) Foreign Application Priority Data

Oct. 5, 2005 (JP) ............................. 2005-292319

(51) Int. Cl.
  *C08L 83/00* (2006.01)
  *C08F 8/00* (2006.01)
(52) U.S. Cl. .................................... 524/588; 525/105
(58) Field of Classification Search ................. 524/588
  See application file for complete search history.

(56) References Cited

U.S. PATENT DOCUMENTS

| 7,202,306 | B2 | 4/2007 | Tanaka et al. |
| 2005/0009979 | A1* | 1/2005 | Tanaka et al. ............... 524/492 |
| 2005/0070672 | A1* | 3/2005 | Ozawa et al. ............ 525/331.9 |

FOREIGN PATENT DOCUMENTS

| JP | 2000 273126 | 10/2000 |
| JP | 2003 514078 | 4/2003 |
| JP | 2005 8870 | 1/2005 |
| WO | 91 06580 | 5/1991 |
| WO | 03 046020 | 6/2003 |
| WO | 03 087171 | 10/2003 |
| WO | 2006 101025 | 9/2006 |

OTHER PUBLICATIONS

U.S. Appl. No. 12/521,331, filed Jun. 26, 2009, Tanaka, et al.
U.S. Appl. No. 12/521,124, filed Jun. 25, 2009, Tanaka, et al.
U.S. Appl. No. 12/521,340, filed Jun. 26, 2009, Tanaka, et al.

* cited by examiner

*Primary Examiner* — David Wu
*Assistant Examiner* — Hui Chin
(74) *Attorney, Agent, or Firm* — Oblon, Spivak, McClelland, Maier & Neustadt, L.L.P.

(57) ABSTRACT

A process for producing a modified conjugated diene polymer includes subjecting an active terminal of a conjugated diene polymer having a vinyl content of less than 10% and a cis-1,4 bond content of 75% or more to a modification reaction with an alkoxysilane compound, and subjecting the alkoxysilane compound (residue) to a condensation reaction in an aqueous solution at a pH of 9 to 14 and a temperature of 85 to 180° C. in the presence of a condensation accelerator including a compound containing titanium. The modified conjugated diene polymer exhibits low heat build-up and increased reinforcing properties when used for a rubber composition, and exhibits excellent wear resistance, mechanical characteristics, and processability.

19 Claims, No Drawings

US 7,893,153 B2

PROCESS FOR PRODUCING MODIFIED CONJUGATED DIENE POLYMER, MODIFIED CONJUGATED DIENE POLYMER OBTAINED BY THE PROCESS, AND RUBBER COMPOSITION CONTAINING THE SAME

This application is a 371 of PCT/JP2006/319895 filed Oct. 4, 2006.

TECHNICAL FIELD

The present invention relates to a process for producing a modified conjugated diene polymer, a modified conjugated diene polymer obtained by the process, and a rubber composition containing the same. More particularly, the present invention relates to a process for producing a modified conjugated diene polymer which exhibits low heat build-up (low fuel consumption) and an excellent reinforcement effect with a filler, a modified polymer obtained by the process, and a rubber composition containing the same.

BACKGROUND ART

In recent years, a reduction in fuel consumption of automobiles has been increasingly demanded in connection with a demand for energy conservation. In order to deal with such a demand, a further reduction in rolling resistance has been desired for tires. A method of reducing the rolling resistance of tires by optimizing the tire structure has been studied. A method using a rubber composition exhibiting low heat build-up has been most generally employed.

In order to obtain a rubber composition exhibiting low heat build-up, a modified rubber has been extensively developed for a rubber composition using silica or carbon black as a filler. In particular, a method of modifying the polymerization active terminal of a conjugated diene polymer obtained by anionic polymerization using an organolithium compound with an alkoxysilane derivative having a functional group which interacts with the filler has been proposed as an effective method.

However, this method is generally applied to a polymer of which the polymer end exhibits living properties. Specifically, an improvement in modification of cis-1,4-polybutadiene particularly important for tire side wall rubber, tire tread rubber, and the like is limited. Moreover, a modification effect on a rubber composition containing silica or carbon black is not necessarily sufficient. In particular, a modification effect on cis-1,4-polybutadiene containing carbon black has been achieved to only a small extent.

In order to overcome the above-mentioned drawback, a method which reacts the active terminal of a conjugated diene polymer having a high cis content obtained using a rare earth catalyst with a functional group-containing alkoxysilane derivative which interacts with a filler to obtain an end-modified conjugated diene polymer, and a method which adds a condensation accelerator to a reaction system at the time of alkoxysilane modification have been proposed (see Patent Documents 1 and 2). However, a further improvement in performance of the resulting modified conjugated diene polymer has been desired.

Patent Document 1: WO 03/046020

Patent Document 2: JP-A-2005-8870

DISCLOSURE OF THE INVENTION

The present invention was conceived in view of the above-described situation. An object of the present invention is to provide a process for producing a modified conjugated diene polymer which further improves low heat build-up and a reinforcement effect when used in a rubber composition and exhibits excellent wear resistance, mechanical characteristics, and processability, a modified polymer obtained by the process, and a rubber composition using the modified conjugated diene polymer.

According to the present invention, there is provided a process for producing a modified conjugated diene polymer comprising subjecting an active terminal of a conjugated diene polymer having a vinyl content of less than 10% and a cis-1,4 bond content of 75% or more to a modification reaction with an alkoxysilane compound, and subjecting the alkoxysilane compound (residue) to a condensation reaction in an aqueous solution at a pH of 9 to 14 and a temperature of 85 to 180° C. in the presence of a condensation accelerator including a compound containing titanium.

The process for producing a modified conjugated diene polymer according to the present invention preferably further includes adding an alkoxysilane compound. It is preferable that the condensation accelerator be an alkoxide, a carboxylate, or an acetylacetonate complex of titanium.

It is preferable that the alkoxysilane compound be an alkoxysilane compound having at least one functional group selected from (a) an epoxy group, (b) an isocyanate group, and (c) a carboxyl group.

In the process for producing a modified conjugated diene polymer according to the present invention, it is preferable to add a compound having at least one functional group selected from (d) an amino group, (e) an imino group, and (f) a mercapto group during the modification reaction in which the alkoxysilane compound is reacted with the active terminal of the conjugated diene polymer.

In the present invention, it is preferable that the conjugated diene compound which forms the modified conjugated diene polymer be at least one conjugated diene compound selected from 1,3-butadiene, isoprene, and 2,3-dimethyl-1,3-butadiene.

In the present invention, it is preferable that the conjugated diene polymer be prepared by polymerizing a conjugated diene compound using a catalyst mainly containing (g) a compound containing a rare earth element having an atomic number of 57 to 71 in the periodic table or a reaction product of the compound with a Lewis base, (h) an alumoxane and/or an organoaluminum compound represented by $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms and may be the same as or different from $R^1$ or $R^2$), and (i) a halogen-containing compound.

According to the present invention, a modified conjugated diene polymer obtained by the above production process and a rubber composition comprising the modified conjugated diene polymer are provided. It is preferable that the rubber composition include a rubber component including the modified conjugated diene polymer in an amount of 20 mass % or more, and silica and/or carbon black in an amount of 20 to 120 parts by mass per 100 parts by mass of the rubber component.

In the above rubber composition, it is preferable that the rubber component include 20 to 100 mass % of the modified conjugated diene polymer, and 0 to 80 mass % of at least one rubber other than the modified conjugated diene polymer selected from the group consisting of a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, and a halogenated butyl rubber (provided that the modified conjugated diene polymer+the rubber other than the modified conjugated diene polymer=100 mass %).

According to the present invention, it is possible to provide a rubber composition which exhibits excellent processability and exhibits excellent fracture characteristics, low heat build-up, low temperature characteristics, and wear resistance when subjected to a vulcanization treatment to form a vulcanized rubber when mixing silica or carbon black with the resulting modified conjugated diene polymer.

BEST MODE FOR CARRYING OUT THE INVENTION

Embodiments of the present invention are described in detail below. Note that the present invention is not limited to the following embodiments.

The production process according to the present invention includes subjecting an active terminal of a conjugated diene polymer having a vinyl content of less than 10% and a cis-1,4 bond content of 75% or more to a modification reaction with an alkoxysilane compound, and subjecting the alkoxysilane compound (residue) to a condensation reaction in an aqueous solution at a pH of 9 to 14 and a temperature of 85 to 180° C. in the presence of a condensation accelerator including a compound containing titanium.

The condensation accelerator is usually added before subjecting the alkoxysilane compound to a condensation reaction after subjecting the active terminal of the conjugated diene polymer to a modification reaction with the alkoxysilane compound. Note that the condensation accelerator may be added before adding the alkoxysilane compound (before carrying out a modification reaction). In this case, after subjecting the active terminal of the conjugated diene polymer to a modification reaction with the alkoxysilane compound, the reaction system may be adjusted to a pH of 9 to 14 and a temperature of 85 to 180° C., and the alkoxysilane compound may be then subjected to a condensation reaction.

The conjugated diene polymer with an active terminal which has a vinyl content of less than 10% and a cis-1,4 bond content of 75% or more may be produced using a solvent or under solvent-free conditions. An inert organic solvent is used as the polymerization solvent. Examples of the inert organic solvent include saturated aliphatic hydrocarbons having 4 to 10 carbon atoms such as butane, pentane, hexane, and heptane, saturated cyclic hydrocarbons having 6 to 20 carbon atoms such as cyclopentane and cyclohexane, aromatic hydrocarbons such as monoolefins (e.g. 1-butene and 2-butene), benzene, toluene, and xylene, and halogenated hydrocarbons such as methylene chloride, chloroform, carbon tetrachloride, trichloroethylene, perchloroethylene, 1,2-dichloroethane, chlorobenzene, bromobenzene, and chlorotoluene.

In the present invention, the polymerization temperature is normally −30° C. to +200° C., and preferably 0° C. to +150° C. The polymerization reaction may be carried out in an arbitrary manner. The polymerization reaction may be carried out using a batch-type reactor, or may be continuously carried out using an apparatus such as a multistage continuous reactor.

When using a polymerization solvent, the monomer concentration in the solvent is normally 5 to 50 mass %, and preferably 7 to 35 mass %.

In order to prevent inactivation of the active terminal-containing polymer, it is necessary to prevent a compound having an inactivation function (e.g., oxygen, water, or carbon dioxide gas) from being mixed in the polymerization system as much as possible.

Examples of conjugated diene compounds used as polymerization monomers in the present invention include 1,3-butadiene, isoprene, 2,3-dimethyl-1,3-butadiene, 1,3-pentadiene, 1,3-hexadiene, myrcene, and the like. Of these, 1,3-butadiene, isoprene, and 2,3-dimethyl-1,3-butadiene are preferable. These conjugated diene compounds may be used either individually or in combination of two or more. A copolymer is obtained when using two or more conjugated diene compounds in combination.

The process for producing the active terminal-containing conjugated diene polymer is not particularly limited. It is preferable that the polymerization catalyst contain at least one compound selected from each of the following components (g), (h), and (i) in combination.

Component (g):

The component (g) is a compound containing a rare earth element having an atomic number of 57 to 71 in the periodic table (hereinafter may be referred to as "rare earth element-containing compound"), or a reaction product of such a rare earth element-containing compound with a Lewis base.

The rare earth element is preferably neodymium, praseodymium, cerium, lanthanum, gadolinium, or a combination thereof, and is more preferably neodymium.

The rare earth element-containing compound used in the present invention is a carboxylate, an alkoxide, a β-diketone complex, a phosphate, or a phosphite.

The carboxylate of the rare earth element is represented by the general formula $(R^4—CO_2)_3M$ (wherein M represents a rare earth element having an atomic number of 57 to 71 in the periodic table). $R^4$ represents a hydrocarbon group having 1 to 20 carbon atoms, and preferably a saturated or unsaturated alkyl group, which is linear, branched, or cyclic, and the carboxyl group is bonded to a primary, secondary, or tertiary carbon atom of the hydrocarbon group. Specific examples of the carboxylate of the rare earth element include salts of octanoic acid, 2-ethylhexanoic acid, oleic acid, stearic acid, benzoic acid, naphthenic acid versatic acid (trade name of a product manufactured by Shell Chemicals Limited, the product being a carboxylic acid in which the carboxyl group is bonded to a tertiary carbon atom), and the like. A salt of 2-ethylhexanoic acid, naphthenic acid, or versatic acid is preferable.

The alkoxide of the rare earth element is represented by the general formula of $(R^5O)_3M$ (wherein M represents a rare earth element having an atomic number of 57 to 71 in the periodic table). $R^5$ represents a hydrocarbon group having 1 to 20 carbon atoms, and preferably a saturated or unsaturated alkyl group, which is linear, branched, or cyclic, and the carboxyl group is bonded to a primary, secondary, or tertiary carbon atom of the hydrocarbon group. Examples of the alkoxy group represented by $R^5O$ include alkoxy groups derived from 2-ethylhexyl alcohol, oleyl alcohol, stearyl alcohol, phenyl alcohol, benzyl alcohol, and the like. Of these, alkoxy groups derived from 2-ethylhexyl alcohol and benzyl alcohol are preferable.

Examples of the β-diketone complex of the rare earth element include an acetylacetone complex, a benzoylacetone complex, a propionylacetone complex, a valerylacetone complex, and an ethylacetylacetone complex of the rare earth element. Of these, the acetylacetone complex and the ethylacetylacetone complex are preferable.

Examples of the phosphate or phosphite of the rare earth element include bis(2-ethylhexyl)phosphate, bis(1-methylheptyl)phosphate, bis(p-nonylphenyl)phosphate, bis(polyethylene glycol p-nonylphenyl)phosphate, (1-methylheptyl)(2-ethylhexyl)phosphate, (2-ethylhexyl)(p-nonylphenyl)phosphate, mono-2-ethylhexyl 2-ethylhexylphosphonate, mono-p-nonylphenyl 2-ethylhexylphosphonate, bis(2-ethylhexyl)phosphinate, bis(1-methylheptyl)phosphinate, bis(p-nonylphenyl)phosphinate, (1-methylheptyl)(2-ethylhexyl)phosphinate, and (2-ethylhexyl)(p-nonylphenyl)phosphinate of the rare earth element. Of these, bis(2-ethylhexyl)phosphate, bis(1-methylheptyl)phosphate, mono-2-ethylhexyl 2-ethylhexylphosphonate, and bis(2-ethylhexyl)phosphinate of the rare earth element are preferable.

Among the above-mentioned compounds, neodymium phosphates and neodymium carboxylates are particularly preferable, with neodymium carboxylates such as neodymium 2-ethylhexanoate and neodymium versatate being most preferable.

The Lewis base used to allow the above-mentioned rare earth element-containing compound to be easily dissolved in the solvent is used as a mixture of the Lewis base and the rare earth element-containing compound or a reaction product of the Lewis base and the rare earth element-containing compound in an amount of 0 to 30 mol, and preferably 1 to 10 mol per mol of the rare earth element-containing compound.

Examples of the Lewis base include acetylacetone, tetrahydrofuran, pyridine, N,N-dimethylformamide, thiophene, diphenyl ether, triethylamine, an organic phosphorous compound, and a monohydric or dihydric alcohol.

The component (g) may be used either individually or in combination of two or more.

Component (h):

The component (h) is an alumoxane and/or an organoaluminum compound represented by $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms and may be the same as or different from $R^1$ or $R^2$). These compounds may be used in combination of two or more.

The alumoxane used as the catalyst in the present invention is a compound having a structure represented by the following formula (I) or (II). The alumoxane may be alumoxane association products disclosed in Fine Chemical, 23 (9), 5 (1994), J. Am. Chem. Soc., 115, 4971 (1993), and J. Am. Chem. Soc., 117, 6465 (1995).

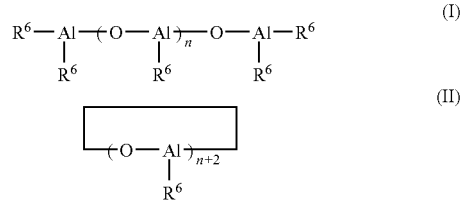

wherein $R^6$ individually represent hydrocarbon groups having 1 to 20 carbon atoms, and n is an integer equal to or larger than two.

Examples of the hydrocarbon group represented by $R^6$ in the alumoxane represented by the formula (I) or (II) include a methyl group, an ethyl group, a propyl group, a butyl group, an isobutyl group, a t-butyl group, a hexyl group, an isohexyl group, an octyl group, an isooctyl group, and the like. Of these, a methyl group, an ethyl group, an isobutyl group, and a t-butyl group are preferable, with a methyl group being particularly preferable. n represents an integer equal to or larger than two, and preferably an integer from 4 to 100.

Specific examples of the alumoxane include methylalumoxane, ethylalumoxane, n-propylalumoxane, n-butylalumoxane, isobutylalumoxane, t-butylalumoxane, hexylalumoxane, isohexylalumoxane, and the like.

The alumoxane may be produced by a known method. For example, the alumoxane may be produced by adding a trialkylaluminum or a dialkylaluminum monochloride to an organic solvent such as benzene, toluene, or xylene, further adding water, water vapor, a water vapor-containing nitrogen gas, or a salt containing crystal water such as copper sulfate pentahydrate or aluminum sulfate hexadecahydrate, and reacting the mixture.

The alumoxane may be used either individually or in combination of two or more.

Examples of $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms and may be the same as or different from $R^1$ or $R^2$), which may also be used as the component (h) used as the catalyst in the present invention, include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihydride, n-propylaluminum dihydride, isobutylaluminum dihydride, and the like. Of these, triethylaluminum, triisobutylaluminum, diethylaluminum hydride, and diisobutylaluminum hydride are preferable.

The organoaluminum compounds used as the component (h) according to the present invention may be used either individually or in combination of two or more.

Component (i):

The component (i) used as the catalyst in the present invention is a halogen-containing compound. Preferable examples of the halogen-containing compound include a reaction product of a metal halide and a Lewis base, diethyl aluminum chloride, silicon tetrachloride, trimethylchlorosilane, methyldichlorosilane, dimethyldichlorosilane, methyltrichlorosilane, ethylaluminum dichloride, ethylaluminum sesquichloride, tin tetrachloride, tin trichloride, phosphorus trichloride, benzoyl chloride, t-butyl chloride, and the like.

Examples of the metal halide include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide, and the like. Of these, magnesium chloride, calcium chloride, barium chloride, manganese chloride, zinc chloride, and copper chloride are preferable, with magnesium chloride, manganese chloride, zinc chloride, and copper chloride being particularly preferable.

As the Lewis base reacted with the metal halide, a phosphorus compound, a carbonyl compound, a nitrogen compound, an ether compound, an alcohol, and the like are preferable. Specific examples of the Lewis base include tributyl phosphate, tri-2-ethylhexyl phosphate, triphenyl phosphate, tricresyl phosphate, triethyl phosphine, tributyl phosphine, triphenyl phosphine, diethyl phosphinoethane, diphenyl phosphinoethane, acetylacetone, benzoylacetone, propionitrile acetone, valeryl acetone, ethyl acetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, versatic acid (trade name of a product manufactured by Shell Chemicals Limited, the product being a carboxylic acid in which the carboxyl group is bonded to a tertiary carbon atom), triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, lauryl alcohol, and the like. Of these, tri-2-ethylhexyl phosphate, tricresyl phosphate, acetylacetone, 2-ethylhexanoic acid, versatic acid, 2-ethylhexyl alcohol, 1-decanol, and lauryl alcohol are preferable.

The Lewis base is reacted with the metal halide in an amount of 0.01 to 30 mol, and preferably 0.5 to 10 mol per one mole of the metal halide. The amount of metal remaining in the polymer can be reduced using the reaction product of the metal halide and the Lewis base.

The amount or composition ratio of each component used as the catalyst in the present invention is determined depending on the objective or necessity.

It is preferable to use the component (g) in an amount of 0.00001 to 1.0 mmol per 100 g of the conjugated diene compound. If the amount of the component (g) is less than 0.00001 mmol, polymerization activity decreases. If the amount of the component (g) is more than 1.0 mmol, the catalyst concentration increases so that a catalyst removal step may be required. It is particularly preferable to use the component (g) in an amount of 0.0001 to 0.5 mmol.

The amount of the component (h) used may be expressed by the molar ratio of Al to the component (g). The ratio of the component (g) to the component (h) is 1:1 to 1:500, preferably 1:3 to 1:250, and more preferably 1:5 to 1:200. The molar ratio of the component (g) to the component (i) is 1:0.1 to 1:30, and preferably 1:0.2 to 1:15.

If the amount of catalyst or the component ratio is outside the above range, the catalyst does not act as a highly active catalyst, or a catalyst removal step is required. In addition to the components (g) to (i), the polymerization reaction may be carried out in the presence of hydrogen gas in order to adjust the molecular weight of the resulting polymer.

In addition to the components (g) to (i), a conjugated diene compound and/or a non-conjugated diene compound may be optionally used in an amount of 0 to 1000 mol per mole of the compound used as the component (g). As the conjugated diene compound used to prepare the catalyst, 1,3-butadiene, isoprene, and the like may be used in the same way as the monomers used for polymerization. Examples of the non-conjugated diene compound include divinylbenzene, diisopropenylbenzene, triisopropenylbenzene, 1,4-vinylhexadiene, ethylidenenorbornene, and the like. Although the conjugated diene compound is not indispensable as the catalyst component, the addition of the conjugated diene compound has an advantage of further improving catalytic activity.

In the present invention, the catalyst is produced by dissolving the components (g) to (i) and optionally the conjugated diene compound and/or the non-conjugated diene compound in a solvent, and reacting the mixture. The components may be added in an arbitrary order. It is preferable to previously mix, react, and age the components in order to improve polymerization activity and reduce the polymerization initiation period. The aging temperature is 0 to 100° C., and preferably 20 to 80° C. If the aging temperature is lower than 0° C., aging may not sufficiently proceed. If the aging temperature exceeds 100° C., catalytic activity may decrease or the molecular weight distribution may broaden. The aging time is not particularly limited. The components may be caused to come into contact before adding the components to a polymerization reaction vessel. The aging time is normally 0.5 minutes or more in order to keep the mixture stable for several days.

The above-described active terminal-containing conjugated diene polymer has a vinyl content of less than 10%, preferably less than 5%, and more preferably less than 2%, and a cis-1,4-bond content of 75% or more, preferably 85% or more, and more preferably 90 to 99.9%. The ratio (Mw/Mn) of the weight average molecular weight (Mw) to the number average molecular weight (Mn) of the conjugated diene polymer determined by gel permeation chromatography is preferably 1.01 to 5, and more preferably 1.01 to 4.

If the conjugated diene polymer has a vinyl content of 10% or more or a cis-1,4-bond content of less than 75%, mechanical characteristics and wear resistance after vulcanization may deteriorate. If the Mw/Mn of the conjugated diene polymer exceeds 5, mechanical characteristics, wear resistance, and low heat build-up after vulcanization may deteriorate.

The vinyl content and the cis-1,4-bond content may be easily adjusted by controlling the polymerization temperature, and the Mw/Mn ratio may be easily adjusted by controlling the molar ratio of the components (g) to (i).

The Mooney viscosity ($ML_{1+4}$, 100° C.) of the active terminal-containing conjugated diene polymer is 5 to 50, and preferably 10 to 40. If the Mooney viscosity of the active terminal-containing conjugated diene polymer is less than 5, mechanical characteristics and wear resistance after vulcanization may deteriorate, for example. If the Mooney viscosity of the active terminal-containing conjugated diene polymer exceeds 50, the modified conjugated diene polymer subjected to a modification reaction and a condensation reaction may exhibit inferior processability during kneading.

The Mooney viscosity may be easily adjusted by controlling the molar ratio of the components (g) to (i).

In the present invention, a modification reaction is carried out in which an alkoxysilane compound is reacted with the active terminal of the conjugated diene polymer having a vinyl content of less than 10% and a cis-1,4-cond content of 75% or more which is obtained as described above. The type of the alkoxysilane compound used for the modification reaction (hereinafter may be referred to as "modifier") is not particularly limited. For example, an alkoxysilane compound having at least one functional group selected from (a) an epoxy group, (b) an isocyanate group, and (c) a carboxyl group is preferably used. The alkoxysilane compound may be either a partial condensate or a mixture of the alkoxysilane compound and a partial condensate of the alkoxysilane compound.

The term "partial condensate" used herein refers to a compound in which the SiOR of the alkoxysilane compound partially forms an SiOSi bond through condensation.

It is preferable that at least 10% of the polymer chains of the polymer used in the modification reaction exhibit living properties.

Specific examples of the alkoxysilane compound reacted with the active terminal of the polymer are given below. Examples of epoxy group-containing alkoxysilane compounds include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane. Of these, 3-glycidoxypropyltrimethoxysilane and 2-(3,4-epoxycyclohexyl)ethyltrimethoxysilane are particularly preferable.

Examples of isocyanate group-containing alkoxysilane compounds include 3-isocyanatepropyltrimethoxysilane, 3-isocyanatepropyltriethoxysilane, 3-isocyanatepropylmethyldiethoxysilane, 3-isocyanatepropyltriisopropoxysilane, and the like. Of these, 3-isocyanatepropyltriisopropoxysilane is particularly preferable.

Examples of carboxyl group-containing alkoxysilane compounds include 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane, and the like. Of these, 3-methacryloyloxypropyltrimethoxysilane is particularly preferable.

These alkoxysilane compounds may be used either individually or in combination of two or more. A partial condensate of the above-mentioned alkoxysilane compound may also be used.

The alkoxysilane compound is used in the modification reaction using the modifier in such an amount that the molar ratio of the alkoxysilane compound to the component (g) is preferably 0.01 to 200, and more preferably 0.1 to 150. If the molar ratio of the alkoxysilane compound to the component (g) is less than 0.01, the modification reaction may not sufficiently proceed, whereby the dispersibility of the filler may not be sufficiently improved. As a result, mechanical characteristics, wear resistance, and low heat build-up after vulcanization may deteriorate. If the molar ratio of the alkoxysilane compound to the component (g) exceeds 200, the modification reaction may become uneconomical due to saturation.

The method of adding the modifier is not particularly limited. The modifier may be added at one time, may be added stepwise, or may be added successively, for example. It is preferable to add the modifier at one time.

The modification reaction in the present invention is preferably carried out by means of a solution reaction (the solution may contain unreacted monomers used for polymerization). The modification reaction may be carried out in an arbitrary manner. The modification reaction may be carried out using a batch-type reactor, or may be carried continuously using a multistage continuous reactor or an apparatus such as an inline mixer. It is important to carry out the modification reaction after completion of the polymerization reaction, but before conducting operations necessary for solvent removal, water disposal, heat treatment, polymer isolation, and the like.

The modification reaction temperature may be the same as the polymerization temperature for producing the conjugated diene polymer. Specifically, the modification reaction temperature is preferably 20 to 100° C. The modification reaction temperature is more preferably 40 to 90° C. If the modification reaction temperature decreases, the viscosity of the polymer may increase. If the modification reaction temperature increases, the polymerization active terminal may be easily inactivated.

The modification reaction time is usually five minutes to five hours, and preferably 15 minutes to one hour.

In the present invention, a known aging preventive or reaction termination agent may be optionally added during the modification reaction after introducing the alkoxysilane compound residue into the active terminal of the polymer.

In the present invention, it is preferable to further add an alkoxysilane compound. As the alkoxysilane compound, an alkoxysilane compound having a functional group (hereinafter referred to as "functional group-introducing agent") is preferable from the viewpoint of wear resistance. The functional group-introducing agent is preferably added after introducing the alkoxysilane compound residue into the active terminal of the polymer, but before initiating a condensation reaction. When the functional group-introducing agent is added after initiating a condensation reaction, the functional group-introducing agent may not be uniformly dispersed, whereby reactivity may decrease. The functional group-introducing agent is preferably added when five minutes to five hours, and particularly preferably 15 minutes to one hour has elapsed after initiating a condensation reaction.

The functional group-introducing agent substantially does not react directly with the active terminal, and remains unreacted in the reaction system. The functional group-introducing agent is consumed by a condensation reaction with the alkoxysilane compound residue introduced into the active terminal.

As the functional group-introducing agent, an alkoxysilane compound having at least one functional group selected from (d) an amino group, (e) an imino group, and (f) a mercapto group is preferable. The alkoxysilane compound used as the functional group-introducing agent may be a partial condensate, or a mixture of the alkoxysilane compound and a partial condensate of the alkoxysilane compound.

Specific examples of the functional group-introducing agent are given below. Examples of amino group-containing alkoxysilane compounds include 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, 3-aminopropyltrimethoxysilane, 3-aminopropyltriethoxysilane, aminophenyltrimethoxysilane, aminophenyltriethoxysilane, 3-(N-methylamino)propyltrimethoxysilane, 3-(N-methylamino)propyltriethoxysilane, and the like. Of these, 3-diethylaminopropyl(triethoxy)silane, 3-dimethylaminopropyl(triethoxy)silane, and 3-aminopropyltriethoxysilane are preferable.

Examples of imino group-containing alkoxysilane compounds include 3-(1-hexamethyleneimino)propyl(triethoxy)silane, 3-(1-hexamethyleneimino)propyl(trimethoxy)silane, (1-hexamethyleneimino)methyl(trimethoxy)silane, methyl(1-hexamethyleneimino)(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, trimethoxysilyl compounds, methyldiethoxysilyl compounds, ethyldiethoxysilyl compounds, methyldimethoxysilyl compounds, and ethyldimethoxysilyl compounds corresponding to these triethoxysilyl compounds, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-iso-propoxysilylpropyl)-4,5-dihydroimidazole, N-(3-methyldiethoxysilylpropyl)-4,5-dihydroimidazole, and the like. Of these, 3-(1-hexamethyleneimino)propyl(triethoxy) silane, N-(1-methylpropylidene)-3-(triethoxysilyl)-1-propanamine, N-(1,3-dimethylbutylidene)-3-(triethoxysilyl)-1-propanamine, 3-(1-hexamethyleneimino)propyl(triethoxy) silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole, and N-(3-triethoxysilylpropyl)-4,5-dihydroimidazole are preferable.

Examples of mercapto group-containing alkoxysilane compounds include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, mercaptophenyltriethoxysilane, and the like. Of these, 3-mercaptopropyltriethoxysilane is preferable.

These functional group-introducing agents may be used either individually or in combination of two or more.

In the modification method according to the present invention, when using a functional group-containing alkoxysilane compound as the functional group-introducing agent, the active terminal-containing polymer reacts with a substantially stoichiometric amount of the alkoxysilane compound added to the reaction system, whereby the alkoxysilyl group is introduced to substantially each active terminal (modified reaction). The alkoxysilane compound is then added so that alkoxysilane compound residues are introduced in an amount larger than the equivalent of the active terminals.

A condensation reaction between the alkoxysilyl groups preferably occurs between the (remaining or newly added) free alkoxysilane and the alkoxysilyl group at the end of the polymer, or between the alkoxysilyl groups at the end of the polymer depending on the situation. A reaction between the free alkoxysilanes is unnecessary. Therefore, when adding the alkoxysilane compound, it is preferable that the hydrolyzability of the alkoxysilyl group of the alkoxysilane compound added be lower than that of the alkoxysilyl group at the end of the polymer from the viewpoint of efficiency. For example, it is preferable to use a trimethoxysilyl group-containing compound with high hydrolyzability as the alkoxysilane compound reacted with the active terminal of the polymer, and to use a compound having a less hydrolyzable alkoxysilyl group (e.g., triethoxysilyl group) as the alkoxysilane compound which is further added. On the other hand, it is undesirable to use a triethoxysilyl group-containing compound as the alkoxysilane compound reacted with the active terminal of the polymer, and to use a trimethoxysilyl group-containing compound as the alkoxysilane compound which is further added from the viewpoint of reaction efficiency, although this is included within the scope of the present invention.

The functional group-containing alkoxysilane compound as the functional group-introducing agent is used in such an amount that the molar ratio of the functional group-containing alkoxysilane compound to the component (g) is preferably 0.01 to 200, and more preferably 0.1 to 150. If the molar ratio of the functional group-containing alkoxysilane compound to the component (g) is less than 0.01, a condensation reaction may not sufficiently proceed so that the dispersibility of the filler may not be sufficiently improved. As a result, mechanical characteristics, wear resistance, and low heat build-up after vulcanization may deteriorate. If the molar ratio of the functional group-containing alkoxysilane compound to the component (g) exceeds 200, the condensation reaction may become uneconomical due to saturation.

In the present invention, a condensation accelerator which is a compound containing titanium is used to accelerate the condensation reaction of the alkoxysilane compound used as the modifier (and the functional group-containing alkoxysilane compound which may be used as the functional group-introducing agent).

The condensation accelerator may be added before the modification reaction. Note that it is preferable to add the condensation accelerator after the modification reaction, but before initiating the condensation reaction. When the condensation accelerator is added before the modification reaction, the condensation accelerator may directly react with the active terminal, whereby the alkoxysilyl group may not be introduced into the active terminal. When the condensation accelerator is added after initiating the condensation reaction, the condensation accelerator may not be uniformly dispersed, whereby catalytic performance may decrease. The condensation accelerator is normally added when five minutes to five hours, and preferably 15 minutes to one hour has elapsed after initiating the modification reaction.

The condensation accelerator used in the present invention is a compound containing titanium. It is preferable that the condensation accelerator be an alkoxide, a carboxylate, or an acetylacetonate complex of titanium.

Preferable examples of the alkoxide, carboxylate, or acetylacetonate complex of titanium include tetramethoxytitanium, tetraethoxytitanium, tetra-n-propoxytitanium, tetra-i-propoxytitanium, tetra-n-butoxytitanium, a tetra-n-butoxytitanium oligomer, tetra-sec-butoxytitanium, tetra-tert-butoxytitanium, tetra(2-ethylhexyl)titanium, bis(octanediolate)bis(2-ethylhexyl)titanium, tetra(octanediolate)titanium, titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonatebis (ethylacetoacetate), titanium tributoxyacetylacetonate, titanium dibutoxybis(acetylacetonate), titanium tributoxyethylacetoacetate, titanium butoxyacetylacetonatobis(ethylacetoacetate), titanium tetrakis(acetylacetonate), titanium diacetylacetonatobis(ethylacetoacetate), titanium oxide bis(2-ethylhexanoate), titanium oxide bis(laurate), titanium oxide bis(naphthate), titanium oxide bis(stearate), titanium oxide bis(oleate), titanium oxide bis(linolate), titanium tetrakis(2-ethylhexanoate), titanium tetrakis(laurate), titanium tetrakis(naphthate), titanium tetrakis(stearate), titanium tetrakis(oleate), and titanium tetrakis(linolate).

The condensation accelerator is used in such an amount that the molar ratio of the above compound to the total amount of alkoxysilyl groups in the reaction system is preferably 0.1 to 10, and particularly preferably 0.5 to 5. If the molar ratio of the above compound to the total amount of alkoxysilyl groups is less than 0.1, the condensation reaction may not proceed sufficiently. If the molar ratio of the above compound to the total amount of the alkoxysilyl groups exceeds 10, the effect of the condensation accelerator is saturated, leading to an uneconomical operation.

In the present invention, the condensation reaction is carried out in an aqueous solution. The condensation reaction temperature is 85 to 180° C., preferably 100 to 170° C., and more preferably 110 to 150° C. The pH of the aqueous solution is preferably 9 to 14, and more preferably 10 to 12.

If the condensation reaction temperature is less than 85° C., the condensation reaction proceeds slowly and may not be completed. Therefore, the properties of the resulting modified conjugated diene polymer may change with elapse of time so that a product of the best quality may not be obtained. If the condensation reaction temperature exceeds 180° C., the polymer undergoes an aging reaction to exhibit poor properties.

If the pH of the aqueous solution during the condensation reaction is less than 9, the condensation reaction proceeds slowly and may not be completed. Therefore, the properties of the resulting modified conjugated diene polymer may change with elapse of time so that a product of the best quality may not be obtained. If the pH of the aqueous solution during the condensation reaction exceeds 14, a large amount of components derived from alkaline compounds may remain in the isolated modified conjugated diene polymer. In this case, it is difficult to remove such components.

The condensation reaction time is usually five minutes to 10 hours, and preferably 15 minutes to five hours. If the reaction time is less than five minutes, the condensation reaction may not be completed. If the reaction time exceeds 10 hours, the condensation reaction is saturated.

The pressure inside the reaction system during the condensation reaction is usually 0.01 to 20 MPa, and preferably 0.05 to 10 MPa.

The condensation reaction may be carried out in an arbitrary manner. The condensation reaction may be carried out using a batch reactor, or may be carried out continuously using an apparatus such as a multistage continuous reactor. The condensation reaction may be carried out while removing the solvent.

After completion of condensation, the resulting product is post-treated using a known method to obtain a modified conjugated diene polymer.

The Mooney viscosity ($ML_{1+4}$, 100° C.) of the modified conjugated diene polymer according to the present invention is preferably 10 to 150, and more preferably 15 to 100. If the Mooney viscosity decreases, rubber properties such as fracture characteristics tend to decrease. If the Mooney viscosity increases, processability may be impaired. This makes it difficult to mix the polymer with compounding ingredients.

The rubber composition according to the present invention preferably contains the modified conjugated diene polymer in an amount of at least 20 mass % based on 100 mass % of the total amount of the rubber component. If the amount of the modified conjugated diene polymer is less than 20 mass %, a rubber composition having desired properties may not be obtained, whereby the object of the present invention may not be achieved. The content of the modified conjugated diene polymer in the rubber component is more preferably 30 mass % or more, and particularly preferably 40 mass % or more.

The modified conjugated diene polymer may be used either individually or in combination of two or more. Examples of other rubber components used in combination with the modified conjugated diene polymer include a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, a halogenated butyl rubber, a mixture of these, and the like. The modified conjugated diene polymer may be partially provided with a branched structure using a polyfunctional modifier such as tin tetrachloride or silicon tetrachloride.

It is preferable that the rubber composition according to the present invention contain silica and/or carbon black as a filler.

The silica used as the filler is not particularly limited. Examples of the silica include wet silica (hydrous silicic acid), dry silica (silicic anhydride), calcium silicate, aluminum silicate, and the like. Of these, wet silica, which brings about a most remarkable improvement effect on fracture resistance, wet grip characteristics, and low rolling resistance, is preferable.

The carbon black used as the filler is not particularly limited. For example, SRF, GPF, FEF, HAF, ISAF, SAF, or the like is used. It is preferable to use carbon black having an iodine adsorption (IA) of 60 mg/g or more and a dibutyl phthalate absorption (DBP) of 80 ml/100 g or more. Grip performance and fracture resistance are improved to a large extent using carbon black. HAF, ISAF, and SAF exhibiting excellent wear resistance are particularly preferable.

The silica and/or the carbon black may be used either individually or in combination of two or more.

The silica and/or the carbon black is preferably used in an amount of 20 to 120 parts by mass per 100 parts by mass of the rubber component. The amount of the silica and/or the carbon black is more preferably 25 to 100 parts by mass in view of its reinforcement effect and an improvement in properties due to the reinforcement effect. If the amount of the silica and/or the carbon black is too small, an improvement in fracture resistance is insufficient. If the amount of the silica and/or the carbon black is too large, the rubber composition may exhibit poor processability.

The rubber composition according to the present invention contains the modified conjugated diene polymer obtained by the above-mentioned method. A composition is preferably used which contains a rubber component which contains the modified conjugated diene polymer in an amount of at least 20 mass % and the silica and/or the carbon black in an amount of 20 to 120 parts by mass, and more preferably 25 to 120 parts by mass per 100 parts by mass of the rubber component.

When using the silica as the filler for reinforcement, a silane coupling agent may be added to the rubber composition according to the present invention in order to further improve the reinforcement effect. Examples of the silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, and the like. Of these, bis(3-triethoxysilylpropyl) polysulfide and 3-trimethoxysilylpropylbenzothiazyl tetrasulfide are preferable from the viewpoint of the reinforcement improvement effect. These silane coupling agents may be used either individually or in combination of two or more.

Since the rubber composition according to the present invention uses the modified conjugated diene polymer in which a functional group exhibiting high affinity with silica is introduced into the molecular end as the rubber component, the amount of silane coupling agent used can be reduced as compared with a normal case. The silane coupling agent is preferably used in an amount of 1 to 20 mass % with respect to silica, although the amount differs depending on the type of silane coupling agent. If the amount is too small, the silane coupling agent may not exhibit a sufficient effect. If the amount is too large, the rubber component may gel. The silane coupling agent is preferably used in an amount of 3 to 15 mass % from the viewpoint of a coupling effect and prevention of gelling.

Chemicals commonly used in the rubber industry (e.g., vulcanizing agent, vulcanization accelerator, process oil, aging preventive, antiscorching agent, zinc oxide, and stearic acid) may be optionally added to the rubber composition according to the present invention insofar as the object of the present invention is not impaired.

The rubber composition according to the present invention is obtained by mixing the above-described components using an open mixer such as a roll or a closed mixer such as a Banbury mixer. After molding the rubber composition, the molded product is vulcanized and may be applied to various rubber products. The rubber composition according to the present invention may be suitably used for tire applications (e.g., tire tread, under-tread, carcass, side wall, and bead) and other industrial products (e.g., rubber vibration insulator, fender, belt, and hose). The rubber composition according to the present invention is particularly suitably used as tire tread rubber.

EXAMPLES

The present invention is described in detail below by way of examples. Note that the present invention is not limited to the following examples.

In the examples, "part" and "%" respectively indicate "part by mass" and "mass %" unless otherwise indicated.

In the examples, properties were measured using the following methods.

Mooney Viscosity ($ML_{1+4}$, 100° C.):

The Mooney viscosity ($ML_{1+4}$, 100° C.) was measured under conditions of a preheating time of one minute, a measuring time of four minutes, and a temperature of 100° C.

Mooney Viscosity ($ML_{1+4}$, 125° C.):

The Mooney viscosity ($ML_{1+4}$, 125° C.) was measured under conditions of a preheating time of one minute, a measuring time of four minutes, and a temperature of 125° C.

Molecular Weight Distribution (Mw/Mn):

The molecular weight distribution (Mw/Mn) was measured using an HLC-8120GPC (manufactured by Tosoh Corp.) and a refractive index detector as a detector under the following conditions.

Column: GMHHXL manufactured by Tosoh Corp.

Mobile phase: tetrahydrofuran

Microstructure (cis-1,4 Bond Content and 1,2-vinyl Bond Content):

The microstructure was determined by IR spectroscopy (Morello method).

pH of Aqueous Solution:

The pH of the aqueous solution was measured using a pH meter.

Tensile strength ($T_B$):

The tensile strength ($T_B$) was measured in accordance with JIS K6310.

Low Heat Build-Up (3% tan δ):

Low heat build-up (3% tan δ) was measured using a dynamic spectrometer (manufactured by Rheometrix Co. (U.S.A.)) under conditions of a tensile dynamic strain of 3%, a frequency of 15 Hz, and a temperature of 50° C. Low heat build-up was expressed by an index. The larger the index, the lower the heat build-up.

Low Temperature Properties (−20° C.G'):

The low temperature properties (−20° C.G') were measured using a dynamic spectrometer (manufactured by Rheometrics Scientific Inc. (U.S.A)) under conditions of a tensile dynamic strain of 0.1%, a frequency of 15 Hz, and a temperature of −20° C. The low temperature properties were expressed by an index. The larger the index, the higher the low temperature properties (grip performance on snow and an ice road surface).

Wear Resistance:

The wear resistance was measured at room temperature using a Lambourn abrasion tester (manufactured by Shimada Giken Co., Ltd.) at a slip ratio of 60%. The larger the index, the better the wear resistance.

Example 1

Preparation of Modified Polymer A

A 5 l autoclave of which the internal atmosphere was replaced by nitrogen was charged with 2.4 kg of cyclohexane and 300 g of 1,3-butadiene. After the addition of a catalyst prepared by reacting and aging a cyclohexane solution of neodymium versatate (0.09 mmol), a toluene solution of methylalumoxane (MAO) (1.8 mmol), diisobutylaluminum hydride (DIBAH) (5.0 mmol), a toluene solution of diethylaluminum chloride (0.18 mmol), and 1,3-butadiene (4.5 mmol) at 50° C. for 30 minutes, the mixture was subjected to polymerization at 80° C. for 60 minutes. The reaction conversion rate of 1,3-butadiene was about 100%. A methanol solution containing 1.5 g of 2,4-di-tert-butyl-p-cresol was added to 200 g of the polymer solution to terminate polymerization. After removing the solvent by steam stripping, the resulting product was dried using a roll at 110° C. to obtain an unmodified polymer. The polymerization results are shown in Table 1.

The remaining polymer solution was maintained at 60° C. A toluene solution of 3-glycidoxypropyltrimethoxysilane (GPMOS) (4.5 mmol) was added to the polymer solution and allowed to react for 30 minutes. After the addition of a toluene solution of tetraisopropyl titanate (IPOTi) (13.5 mmol), the components were mixed for 30 minutes. A methanol solution containing 1.5 g of 2,4-di-tert-butyl-p-cresol was then added to the mixture to obtain 2.5 kg of a modified polymer solution.

The modified polymer solution was added to 20 l of a sodium hydroxide aqueous solution of which the pH was adjusted to 10. A condensation reaction was carried out at 110° C. for two hours while removing the solvent, followed by drying using a roll to obtain a modified polymer. Table 1 shows the modification and condensation conditions and the reaction results.

Example 2

Preparation of Modified Polymer B

A modified polymer was obtained in the same manner as in Example 1 except for using a sodium hydroxide aqueous solution of which the pH was adjusted to 12 instead of the sodium hydroxide aqueous solution of which the pH was adjusted to 10. Table 1 shows the modification and condensation conditions and the reaction results.

Example 3

Preparation of Modified Polymer C

A modified polymer was obtained in the same manner as in Example 1 except for carrying out a condensation reaction at 125° C. for two hours while removing the solvent. Table 1 shows the modification and condensation conditions and the reaction results.

Example 4

Preparation of Modified Polymer D

A modified polymer was obtained in the same manner as in Example 1 except for using tetra-2-ethylhexyl titanate (EHOTi) instead of IPOTi. Table 1 shows the modification and condensation conditions and the reaction results.

Example 5

Preparation of Modified Polymer E

A modified polymer was obtained in the same manner as in Example 4 except for using 3-isocyanatopropyltriethoxysilane (IPEOS) instead of GPMOS. Table 1 shows the modification and condensation conditions and the reaction results.

Example 6

Preparation of Modified Polymer F)

A modified polymer was obtained in the same manner as in Example 1 except for using titanium tetraacetylacetonate (TiAC) instead of EHOTi. Table 1 shows the modification and condensation conditions and the reaction results.

Example 7

Preparation of Modified Polymer G)

A modified polymer was obtained in the same manner as in Example 1 except for using tetrakis(2-ethylhexanoate)titanium (EHATi) instead of IPOTi. Table 1 shows the modification and condensation conditions and the reaction results.

Example 8

Preparation of Modified Polymer H

A 5 l autoclave of which the internal atmosphere was replaced by nitrogen was charged with 2.4 kg of cyclohexane and 300 g of 1,3-butadiene. After the addition of a catalyst prepared by reacting and aging a cyclohexane solution of neodymium versatate (0.09 mmol), a toluene solution of MAO (1.8 mmol), DIBAH (5.0 mmol), a toluene solution of diethylaluminum chloride (0.18 mmol), and 1,3-butadiene (4.5 mmol) at 50° C. for 30 minutes, the mixture was subjected to polymerization at 80° C. for 60 minutes. The reaction conversion rate of 1,3-butadiene was about 100%. A methanol solution containing 1.5 g of 2,4-di-tert-butyl-p-cresol was added to 200 g of the polymer solution to terminate polymerization. After removing the solvent by steam stripping, the resulting product was dried using a heat roll at 110° C. to obtain an unmodified polymer. The polymerization results are shown in Table 1.

The remaining polymer solution was maintained at 60° C. After the addition of a toluene solution of GPMOS (4.5 mmol), the components were reacted for 30 minutes. After the addition of 3-aminopropyltriethoxysilane (APEOS) (13.5 mmol), the components were mixed for 30 minutes. After the addition of a toluene solution of IPOTi (13.5 mmol), the components were mixed for 30 minutes. A methanol solution containing 1.5 g of 2,4-di-tert-butyl-p-cresol was then added to the mixture to obtain 2.5 kg of a modified polymer solution.

The modified polymer solution was added to 20 l of a sodium hydroxide aqueous solution of which the pH was adjusted to 10. A condensation reaction was carried out at 110° C. for two hours while removing the solvent, followed by drying using a roll to obtain a modified polymer. Table 1 shows the modification and condensation conditions and the reaction results.

Example 9

Preparation of Modified Polymer I

A modified polymer was obtained in the same manner as in Example 8, except for using a toluene solution of N-(3-triethoxysilylpropyl)-4,5-dihydroimidazole (EOSDI) instead of the toluene solution of APEOS. Table 1 shows the modification and condensation conditions and the reaction results.

Example 10

Preparation of Modified Polymer J

A modified polymer was obtained in the same manner as in Example 8 except for using a toluene solution of 3-mercaptopropyltriethoxysilane (MPEOS) instead of the toluene solution of APEOS. Table 1 shows the modification and condensation conditions and the reaction results.

Comparative Example 1

Preparation of Modified Polymer K

A modified polymer was obtained in the same manner as in Example 1 except for using a sodium hydroxide aqueous solution of which the pH was adjusted to 7 instead of the sodium hydroxide aqueous solution of which the pH was adjusted to 10. Table 1 shows the modification and condensation conditions and the reaction results.

Comparative Example 2

Preparation of Modified Polymer L

A modified polymer was obtained in the same manner as in Example 1 except for carrying out a condensation reaction at 80° C. for two hours while removing the solvent. Table 1 shows the modification and condensation conditions and the reaction results.

Comparative Example 3

Preparation of Modified Polymer M

A modified polymer was obtained in the same manner as in Example 1 except that IPOTi was not added. Table 1 shows the modification and condensation conditions and the reaction results.

Comparative Example 4

Preparation of Modified Polymer N

A modified polymer was obtained in the same manner as in Example 1 except for using bis(2-ethylhexanoate)tin (EHASn) instead of IPOTi. Table 1 shows the modification and condensation conditions and the reaction results.

Comparative Example 5

Preparation of Modified Polymer O

A modified polymer was obtained in the same manner as in Example 8 except for using bis(2-ethylhexanoate)tin (EHASn) instead of IPOTi. Table 1 shows the modification and condensation conditions and the reaction results.

Comparative Example 6

Polymer P

The analysis results for commercially available polybutadiene rubber (polybutadiene rubber BR01 manufactured by JSR Corporation) are shown in Table 1.

As is clear from the results for Examples 1 to 3 and Comparative Examples 1 and 2, the improvement in the stability with elapse of time was obtained by carrying out the condensation reaction at a pH of 9 to 14 and a temperature of 85 to 180° C.

As is clear from the results for Examples 1 and 4 to 7 and Comparative Example 3, the improvement in the stability with elapse of time was obtained by adding the compound containing titanium as the condensation accelerator.

Examples 11 to 20 and Comparative Examples 7 to 12

Silica-containing rubber compositions (formulation 1) and carbon black-containing rubber compositions (formulation 2) shown in Table 2 were prepared using the polymers A to P obtained in Examples 1 to 10 and Comparative Examples 1 to 6.

The Mooney viscosities of the resulting unvulcanized rubber compositions were measured. The rubber compositions prepared based on the formulation 1 were vulcanized at 150° C. for 12 minutes. The rubber compositions based on the formulation 2 were vulcanized at 145° C. for 30 minutes. The properties of the vulcanized rubber were then evaluated. The results are shown in Table 3.

As is clear from the results for the silica-containing rubber compositions obtained in Examples 11 to 17 and Comparative Examples 9 to 10, the modified polymers using the compound containing titanium as the condensation accelerator exhibited excellent processability due to the low Mooney viscosity, low heat build-up, improved low temperature properties, and improved wear resistance. As is clear from the results for the silica-containing rubber compositions obtained in Examples 16 to 20 and Comparative Example 11 (the functional group-introducing agent was added), the modified polymers using the compound containing titanium as the condensation accelerator also exhibited excellent processability due to the low Mooney viscosity, low heat build-up, improved low temperature properties, and improved wear resistance when compounded as a rubber composition.

As is clear from the results for the carbon black-containing rubber compositions obtained in Example 11 and Comparative Example 10, the modified polymers using the compound containing titanium as the condensation accelerator exhibited excellent processability due to the low Mooney viscosity. As is clear from the results for the carbon black-containing rubber compositions obtained in Examples 18 to 20 and Comparative Example 11 (the functional group-introducing agent was added), the modified polymers using the compound containing titanium as the condensation accelerator also exhibited excellent processability due to the low Mooney viscosity.

TABLE 1

| | Result of polymerization reaction | | | | | | |
|---|---|---|---|---|---|---|---|
| | $ML_{1+4}$ (100° C.) | Mw/Mn*1 | cis-1,4 bond content (%) | 1,2-Vinyl bond content (%) | Modifier*2 | Functional group-introducing agent*2 | Condensation accelerator*2 |
| Exam. 1 | 21 | 2.2 | 96.8 | 1.2 | GPMOS (4.5 mmol) | — | IPOTi (13.5 mmol) |
| Exam. 2 | 22 | 2.1 | 97.2 | 1.1 | GPMOS (4.5 mmol) | — | IPOTi (13.5 mmol) |
| Exam. 3 | 19 | 2.2 | 96.9 | 1.1 | GPMOS (4.5 mmol) | — | IPOTi (13.5 mmol) |
| Exam. 4 | 18 | 2.3 | 97.0 | 1.1 | GPMOS (4.5 mmol) | — | EHOTi (13.5 mmol) |
| Exam. 5 | 20 | 2.2 | 96.9 | 1.2 | IPEOS (4.5 mmol) | — | EHOTi (13.5 mmol) |
| Exam. 6 | 20 | 2.2 | 97.0 | 1.1 | IPEOS (4.5 mmol) | — | TiAC (13.5 mmol) |
| Exam. 7 | 21 | 2.1 | 96.7 | 1.2 | GPMOS (4.5 mmol) | — | EHATi (13.5 mmol) |
| Exam. 8 | 20 | 2.1 | 96.8 | 1.2 | GPMOS (4.5 mmol) | APEOS (13.5 mmol) | IPOTi (13.5 mmol) |
| Exam. 9 | 19 | 2.1 | 96.9 | 1.1 | GPMOS (4.5 mmol) | EOSDI (13.5 mmol) | IPOTi (13.5 mmol) |
| Exam. 10 | 19 | 2.1 | 97.1 | 1.1 | GPMOS (4.5 mmol) | MPEOS (13.5 mmol) | IPOTi (13.5 mmol) |
| Comp. Exam. 1 | 20 | 2.1 | 96.8 | 1.2 | GPMOS (4.5 mmol) | | IPOTi (13.5 mmol) |

TABLE 1-continued

| | | | | | | | |
|---|---|---|---|---|---|---|---|
| Comp. Exam. 2 | 19 | 2.1 | 97.2 | 1.1 | GPMOS (4.5 mmol) | — | IPOTi (13.5 mmol) |
| Comp. Exam. 3 | 21 | 2.2 | 96.9 | 1.1 | GPMOS (4.5 mmol) | — | — (13.5 mmol) |
| Comp. Exam. 4 | 20 | 2.2 | 97.2 | 1.2 | GPMOS (4.5 mmol) | — | EHASn (13.5 mmol) |
| Comp. Exam. 5 | 21 | 2.1 | 97.1 | 1.2 | GPMOS (4.5 mmol) | APEOS (13.5 mmol) | EHASn (13.5 mmol) |
| Comp. Exam. 6*[3] | 45 | 4.0 | 95.0 | 2.5 | — | — | — |

| | Condensation reaction condition | | Results for modification and ondensation reaction | | Stability with elapse of time $\Delta ML_{1+4}$ |
|---|---|---|---|---|---|
| | pH of aqueous solution | Temperature of aqueous solution | $ML_{1+4}$ (125° C.) | Mw/Mn*[1] | (125° C.) after two days at 90° C. |
| Exam. 1 | 10 | 110 | 48 | 2.6 | 1 |
| Exam. 2 | 12 | 110 | 50 | 2.7 | 1 |
| Exam. 3 | 10 | 125 | 45 | 2.6 | 1 |
| Exam. 4 | 10 | 110 | 43 | 2.7 | 1 |
| Exam. 5 | 10 | 110 | 46 | 2.8 | 1 |
| Exam. 6 | 10 | 110 | 46 | 2.7 | 1 |
| Exam. 7 | 10 | 110 | 50 | 2.7 | 1 |
| Exam. 8 | 10 | 110 | 43 | 3.2 | 2 |
| Exam. 9 | 10 | 110 | 41 | 3.1 | 2 |
| Exam. 10 | 10 | 110 | 41 | 3.0 | 2 |
| Comp. Exam. 1 | 7 | 110 | 37 | 2.4 | 11 |
| Comp. Exam. 2 | 10 | 80 | 35 | 2.4 | 13 |
| Comp. Exam. 3 | 10 | 110 | 57 | 2.8 | 8 |
| Comp. Exam. 4 | 10 | 110 | 69 | 3.0 | 1 |
| Comp. Exam. 5 | 10 | 110 | 63 | 3.3 | 2 |
| Comp. Exam. 6*[3] | — | — | — | — | 1 |

TABLE 2

| Compounding ratio | Formulation 1 | Formulation 2 |
|---|---|---|
| Polymers A to P | 70 | 50 |
| Natural rubber | 30 | 50 |
| Silica*[1] | 55 | 0 |
| Carbon black*[2] | 0 | 50 |
| Aroma oil*[3] | 10 | 10 |
| Stearic acid | 2 | 2 |
| Silane coupling agent*[4] | 5.5 | 0 |

TABLE 2-continued

| Compounding ratio | Formulation 1 | Formulation 2 |
|---|---|---|
| Aging preventive*[5] | 1 | 1 |
| Zinc oxide | 3 | 3 |
| Vulcanization accelerator DPG*[6] | 1 | 0.5 |
| Vulcanization accelerator DM*[7] | 1 | 0.5 |
| Vulcanization accelerator NS*[8] | 1 | 0.5 |
| Sulfur | 1.5 | 1.5 |

TABLE 3

| | | Formulation 1 (silica-containing rubber composition) | | | | | Formulation 2 (carbon black-containing rubber composition) | | | |
|---|---|---|---|---|---|---|---|---|---|---|
| | Polymer | Mooney viscosity $ML_{1+4}$ (100° C.) | Tensile strength $T_B$(MPa) | Low heat build-up 3% tan$\delta$*[1] | Low temperature properties −20° C. CG'*[1] | Wear resistance*[1] | Mooney viscosity $ML_{1+4}$ (100° C.) | Tensile strength $T_B$(MPa) | Low heat build-up 3% tan$\delta$*[1] | Wear resistance*[1] |
| Example 11 | A | 61 | 20.8 | 133 | 184 | 131 | 87 | 27.1 | 123 | 127 |
| Example 12 | B | 62 | 21.2 | 135 | 183 | 133 | — | — | — | — |
| Example 13 | C | 60 | 20.2 | 129 | 179 | 137 | — | — | — | — |
| Example 14 | D | 59 | 20.9 | 131 | 186 | 134 | — | — | — | — |
| Example 15 | E | 60 | 21.5 | 137 | 187 | 138 | — | — | — | — |
| Example 16 | F | 59 | 20.6 | 137 | 178 | 129 | — | — | — | — |
| Example 17 | G | 60 | 21.2 | 134 | 181 | 132 | — | — | — | — |
| Example 18 | H | 56 | 22.1 | 133 | 173 | 134 | 83 | 26.4 | 138 | 132 |

TABLE 3-continued

| | | Formulation 1 (silica-containing rubber composition) | | | | | Formulation 2 (carbon black-containing rubber composition) | | | |
|---|---|---|---|---|---|---|---|---|---|---|
| | Polymer | Mooney viscosity $ML_{1+4}$ (100° C.) | Tensile strength $T_B$(MPa) | Low heat build-up 3% tanδ*[1] | Low temperature properties −20° C. CG'*[1] | Wear resistance*[1] | Mooney viscosity $ML_{1+4}$ (100° C.) | Tensile strength $T_B$(MPa) | Low heat build-up 3% tanδ*[1] | Wear resistance*[1] |
| Example 19 | I | 57 | 20.6 | 134 | 178 | 136 | 82 | 26.7 | 135 | 129 |
| Example 20 | J | 62 | 21.8 | 127 | 162 | 141 | 89 | 28.4 | 129 | 139 |
| Comp. Example 7 | K | 57 | 20.4 | 119 | 163 | 122 | 85 | — | — | — |
| Comp. Example 8 | L | 57 | 21.2 | 121 | 162 | 124 | — | — | — | — |
| Comp. Example 9 | M | 67 | 20.8 | 108 | 126 | 125 | — | — | — | — |
| Comp. Example 10 | N | 70 | 21.4 | 124 | 162 | 125 | 100 | 25.8 | 122 | 124 |
| Comp. Example 11 | O | 68 | 21.8 | 125 | 151 | 124 | 98 | 28.1 | 133 | 128 |
| Comp. Example 12 | P | 72 | 18.5 | 100 | 100 | 100 | 84 | 25.3 | 100 | 100 |

In Table 1, *[1] to *[3] have the following meanings.
*[1] Ratio of weight average molecular weight (Mw) to number average molecular weight Mn)
*[2] GPMOS: 3-glycidoxypropyltrimethoxysilane
IPEOS: 3-isocyanatopropyltriethoxysilane
APEOS: 3-aminopropyltriethoxysilane
EOSDI: N-(3-triethoxysilylpropyl)-4,5-dihydroimidazole
MPEOS: 3-mercaptopropyltriethoxysilane
IPOTi: tetraisopropyl titanate
EHOTi: tetra-2-ethylhexyl titanate
TiAC: titanium tetraacetylacetonate
EHATi: tetrakis(2-ethylhexanoate)titanium
EHASn: bis(2-ethylhexanoate)tin
*[3] BR (JSRBR01) manufactured by JSR Corporation
In Table 2, *[1] to *[8] have the following meanings.
*[1] Nipsil AQ manufactured by Tosoh Silica Corporation
*[2] Seast KH manufactured by Tokai Carbon Co., Ltd.
*[3] Fukkol Aromax #3 manufactured by Fuji Kosan Co., Ltd.
*[4] Si69 manufactured by Degussa (bis(3-triethoxysilylpropyl) tetrasulfide)
*[5] Nocrac 6C manufactured by Ouchi Shinko Chemical Industrial Co., Ltd. (N-phenyl-N'-(1,3-dimethylbutyl)-p-phenylenediamine)
*[6] Nocceler D manufactured by Ouchi Shinko Chemical Industrial Co., Ltd. (1,3-diphenylguanidine)
*[7] Nocceler DM manufactured by Ouchi Shinko Chemical Industrial Co., Ltd. (di-2-benzothiazolyl disulfide)
*[8] Nocceler NS-F manufactured by Ouchi Shinko Chemical Industrial Co., Ltd. (N-t-butyl-2-benzothiazolylsulfeneamide)
In Table 3, *[1] has the Following Meaning.
*[1] The larger the value, the better the properties provided that the value of Comparative Example 12 is 100.

INDUSTRIAL APPLICABILITY

According to the present invention, a rubber composition can be obtained which exhibits excellent processability and exhibits excellent fracture characteristics, low heat build-up, low temperature characteristics, and wear resistance when vulcanized to form a vulcanized rubber, irrespective of whether silica or carbon black is added to the resulting modified conjugated diene polymer.

Therefore, a rubber composition containing the modified conjugated diene polymer obtained according to the present invention is suitably used for tire treads, under-treads, carcasses, side walls, and beads, as well as other industrial products such as rubber vibration insulators, fenders, belts, and hoses. In particular, the rubber composition is suitably used for tire treads.

The invention claimed is:

1. A process for producing a modified conjugated diene polymer comprising subjecting an active terminal of a conjugated diene polymer having a vinyl content of less than 10% and a cis-1,4 bond content of 75% or more to a modification reaction with an alkoxysilane compound, and subjecting the alkoxysilane compound (residue) to a condensation reaction in an aqueous solution at a pH of 9 to 14 and a temperature of 85 to 180° C. in the presence of a condensation accelerator comprising a compound containing titanium.

2. The process according to claim 1, further comprising adding an alkoxysilane compound having a functional group.

3. The process according to claim 1, wherein the condensation accelerator is an alkoxide, a carboxylate, or an acetylacetonate complex of titanium.

4. The process according to claim 1, wherein the alkoxysilane compound used for the modification reaction is an alkoxysilane compound comprising at least one functional group selected from (a) an epoxy group, (b) an isocyanate group, and (c) a carboxyl group.

5. The process according to claim 1, further comprising adding a compound comprising at least one functional group selected from (d) an amino group, (e) an imino group, and (f) a mercapto group.

6. The process according to claim 1, wherein a conjugated diene compound which forms the modified conjugated diene polymer is at least one conjugated diene compound selected from 1,3-butadiene, isoprene, and 2,3-dimethyl-1,3-butadiene.

7. The process according to claim 1, wherein the conjugated diene polymer is prepared by polymerizing a conjugated diene compound using a catalyst mainly containing (g) a compound containing a rare earth element having an atomic number of 57 to 71 in the periodic table or a reaction product of the compound with a Lewis base, (h) an alumoxane and/or an organoaluminum compound represented by $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms and may be the same as or different from $R^1$ or $R^2$), and (i) a halogen-containing compound.

8. A modified conjugated diene polymer produced by the process according to claim 1.

9. A rubber composition comprising the modified conjugated diene polymer according to claim 8.

10. The rubber composition according to claim 9, wherein the rubber composition includes a rubber component comprising the modified conjugated diene polymer in an amount of 20 mass % or more, and silica and/or carbon black in an amount of 20 to 120 parts by mass per 100 parts by mass of the rubber component.

11. The rubber composition according to claim 9, wherein the rubber component comprises 20 to 100 mass % of the modified conjugated diene polymer, and 0 to 80 mass % of at least one rubber other than the modified conjugated diene polymer selected from the group consisting of a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, and a halogenated butyl rubber (provided that the modified conjugated diene polymer+the rubber other than the modified conjugated diene polymer=100 mass %).

12. The rubber composition according to claim 10, wherein the rubber component comprises 20 to 100 mass % of the modified conjugated diene polymer, and 0 to 80 mass % of at least one rubber other than the modified conjugated diene polymer selected from the group consisting of a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, and a halogenated butyl rubber (provided that the modified conjugated diene polymer+the rubber other than the modified conjugated diene polymer=100 mass %).

13. The process according to claim 2, wherein the condensation accelerator is an alkoxide, a carboxylate, or an acetylacetonate complex of titanium.

14. The process according to claim 2, the process further comprising adding a compound having at least one functional group selected from (d) an amino group, (e) an imino group, and (f) a mercapto group.

15. The process according to claim 3, the process further comprising adding a compound having at least one functional group selected from (d) an amino group, (e) an imino group, and (f) a mercapto group.

16. The process according to claim 13, the process further comprising adding a compound having at least one functional group selected from (d) an amino group, (e) an imino group, and (f) a mercapto group.

17. The process according to claim 4, the process further comprising adding a compound having at least one functional group selected from (d) an amino group, (e) an imino group, and (f) a mercapto group.

18. The process according to claim 6, wherein the conjugated diene polymer is prepared by polymerizing a conjugated diene compound using a catalyst mainly containing (g) a compound containing a rare earth element having an atomic number of 57 to 71 in the periodic table or a reaction product of the compound with a Lewis base, (h) an alumoxane and/or an organoaluminum compound represented by $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms and may be the same as or different from $R^1$ or $R^2$), and (i) a halogen-containing compound.

19. The process according to claim 2, wherein the alkoxysilane compound having a functional group is added after the modification reaction, but before the condensation reaction.

* * * * *